United States Patent [19]

Sakaguchi et al.

[11] 4,401,308
[45] Aug. 30, 1983

[54] SCROLL CHUCK DEVICE

[75] Inventors: Ryo Sakaguchi; Yoshiharu Ikenaka, both of Higashi Osaka, Japan

[73] Assignee: Rex Industries Co., Ltd., Osaka, Japan

[21] Appl. No.: 260,279

[22] Filed: May 4, 1981

[30] Foreign Application Priority Data

Feb. 13, 1981 [JP] Japan .................. 56-18158[U]

[51] Int. Cl.³ .................. B23B 31/16; B23B 31/38
[52] U.S. Cl. .................. 279/114; 192/56 R
[58] Field of Search .............. 279/114, 115, 116, 119, 279/112; 192/45, 56 R

[56] References Cited

U.S. PATENT DOCUMENTS

| 1,579,057 | 5/1926 | Asbury | 192/56 R |
| 2,151,345 | 3/1939 | Bonis | 192/45 |
| 2,283,965 | 5/1942 | Brancolino | 192/45 |
| 2,490,172 | 12/1949 | Swahnberg | 192/56 R |
| 2,588,938 | 3/1952 | Rogers | 279/114 |
| 2,822,181 | 2/1958 | Sloan | 279/114 |
| 2,938,733 | 5/1960 | Judelson | 279/114 |
| 3,028,169 | 4/1962 | Skillin | 279/114 |

Primary Examiner—Z. R. Bilinsky
Assistant Examiner—Daniel W. Howell
Attorney, Agent, or Firm—Merchant, Gould, Smith, Edell, Welter & Schmidt

[57] ABSTRACT

A scroll chuck device comprising an annular body, a ring plate which is rotatably fitted in the annular body and which has scroll grooves, jaw holders on the ring plate which have clamping jaws and which are engaged in the corresponding scroll grooves so that the relative rotational movement between the ring plate and the jaw holders causes the latter to radially move, and clutch means between the annular body and the ring plate.

7 Claims, 12 Drawing Figures

SCROLL CHUCK DEVICE

This invention relates to a scroll chuck device for use with various kinds of machine tools.

This invention is advantageously adapted particularly for use with machine tools as described in U.S. patent application Ser. No. 92,581, now U.S. Pat. No. 4,279,182, which was assigned to an assignee of this application. However the machine tools with which the scroll chuck device of this application is used is not limited to the type and the kind of the machine tools disclosed in the U.S. patent application.

A scroll chuck usually includes a ring plate which is provided thereon with scroll grooves and two or three (or more) clamping jaws movably attached onto the ring plate so that the relative rotational movement between the ring plate and the clamping jaws causes the latter to radially move, thereby to clamp a workpiece, such as a pipe which extends through the center opening of the ring plate, at two or three points on the outer periphery of the workpiece. A brake member such as a spring is usually provided to give a brake force to the ring plate or the clamping jaws so that the ring plate and the clamping jaws relatively rotate until the clamping jaws clamp the outer periphery of the workpiece and are integral with each other after clamping. That is, after clamping, the ring plate and the clamping jaws rotate together or are both immovable.

In case of a rotatable scroll chuck which rotates together with a workpiece held by the chuck, the chuck is connected, for example to a spindle of a machine tool so as to rotate together with the spindle. It is necessary to immovably hold the ring plate in order to move the clamping jaws in radial directions of the ring plate until the clamping jaws clamp the workpiece. For this purpose, a braking spring is provided on the outer periphery of the ring plate to press the ring plate so that the ring plate is prevented from rotating together with the clamping jaws. Once the clamping jaws come into contact with the outer periphery of the workpiece, the clamping jaws cannot radially move anymore, and, accordingly, the ring plate begins to rotate together with and by means of the clamping jaws against the force of the braking spring. Apparently, in the known chuck device as mentioned above, the braking spring always applies the braking force to the ring plate, and, accordingly, to the clamping jaws, even during the rotational movement of the workpiece, i.e. even during the machining operation. However, the braking force is essentially required only to clamp the workpiece by means of the clamping jaws and is unnecessary during the machining operation. On the contrary, the braking force should be removed when the workpiece is machined, since the braking force provides a resistance against the output of the rotational movement of the machine. It is, therefore, necessary to increase the output of the machine by a value corresponding to the braking force during the machining operation, in the known device in which the braking force always acts, which is apparently uneconomical. In addition, the braking force has a bad influence on a reliability of the machining operation.

The object of the present invention is, therefore, to provide a scroll chuck device in which a braking force acting on the chuck device can be selectively released.

The invention will be explained below in detail with reference to the accompanying drawings in which.

Figure 1:
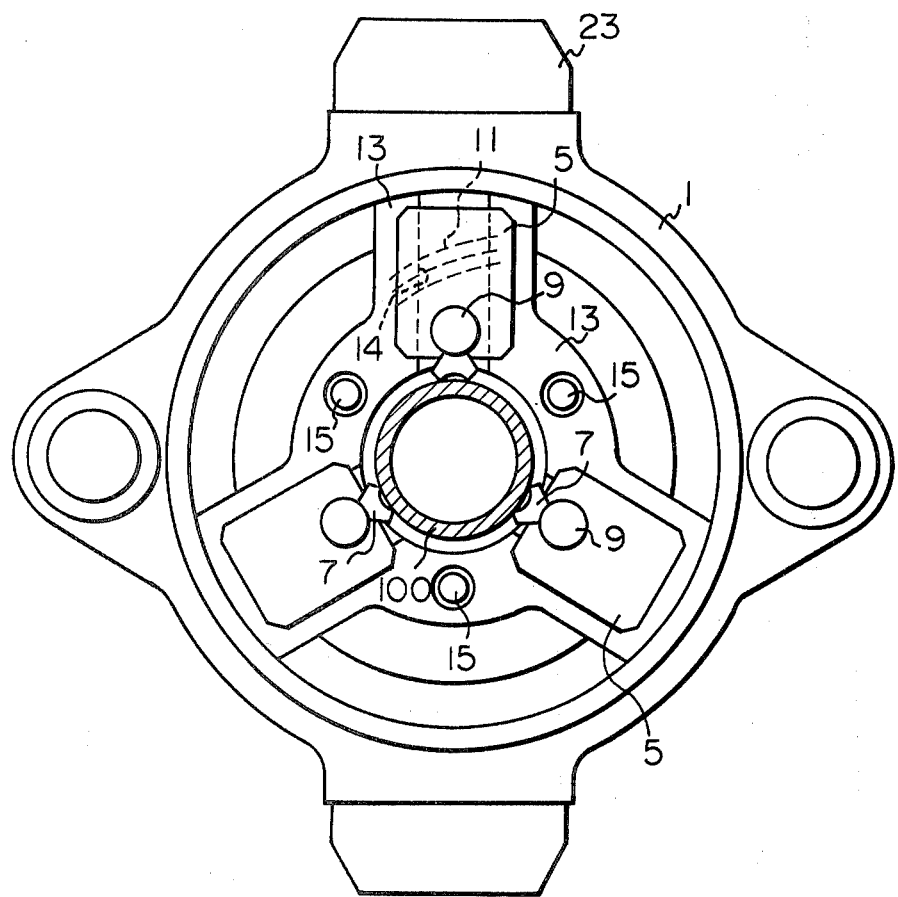
FIG. 1 is an elevational view of a scroll chuck device, according to the present invention.

The scroll chuck device of this invention has an annular body 1 which is provided, on its inner periphery, with a ring plate 3 which is rotatable relative to the annular body 1. The ring plate 3 has scroll grooves 11 in which curved projections 5A of jaw holders 5 attached to the ring plate 3 are engaged. Preferably, three jaw holders 5 are concentrically arranged at an angular distance of 120°. Alternatively, it is also possible to provide two jaw holders 5 which are diametrically arranged on the ring plate 3. The number of the jaw holders 5 is not limited to two or three and can be more than three. The jaw holders 5 are concentrically arranged at an equiangular distance. The jaw holders 5 are slidably fitted in guide channels 14 of an annular holder support 13 which is secured, by means of bolts 15, to an immovable part 17 which is, for example, in the form of an annular sleeve, of an associated machine (not shown) for use with the scroll chuck device of the present invention. The ring plate 3 is fitted on the immovable part (sleeve) 17. Each jaw holder 5 has, at its front i.e. inner end, a clamping jaw 7 which is secured thereto by means of a bolt 9. A blank 100, such as a pipe extends through center openings of the immovable part 17 and the support 13. Therefore, when the ring plate 3 rotates around the axis A—A of the blank 100, the jaw holders 5 and accordingly the clamping jaws 7 are simultaneously and radially moved by means of a scroll mechanism composed of the scroll grooves 11 and the projections 5A of the jaw holders 5, so that the clamping jaws 7 hold the periphery of the blank 100 in a three-point support fashion. The rotation of the ring plate 3 will be explained hereinafter.

Figure 3:
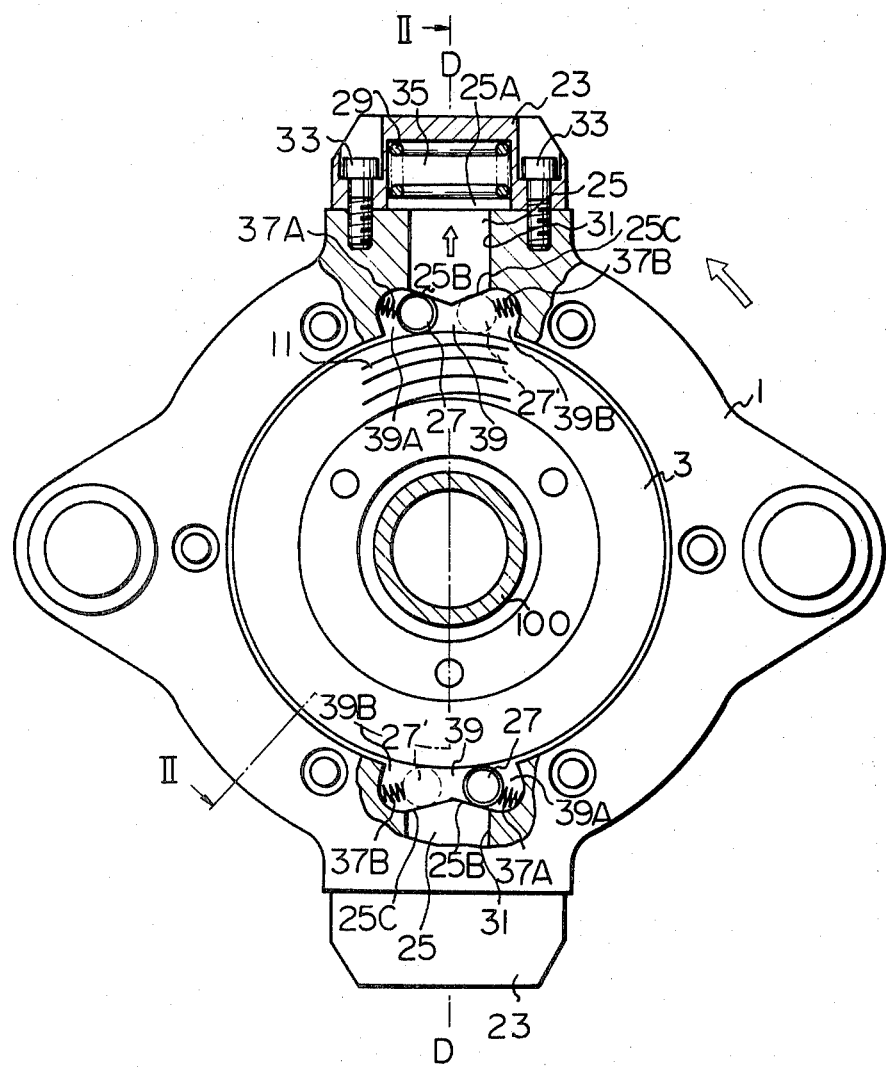
FIG. 3 is a partially sectioned elevational view of a scroll chuck device, showing a clutch device thereof, with jaw holders removed.

The annular body 1 has, for example, two radial holes 31 which are diametrically arranged and which are, for example, cylindrical. The inner ends of the radial holes 31 are connected to spaces 39 formed in the annular body 1. Each of the spaces 39 consists of two chambers 39A and 39B which are symmetrical to each other with respect to the diameter D—D (FIG. 3) of the annular body 1. Each chamber is outwardly expanded, that is, the volume of each chamber 39A (39B) increases as it departs from the line of symmetry (i.e. line D—D). In the chambers 39A and 39B there are arranged springs 37A and 37B which are secured at one end thereof, to the inner end wall of the chambers 39A and 39B, respectively. The free end of the springs 37A or 37B bears against roll pins 27 arranged in each of the spaces 39. In FIG. 3, the roll pins 27 are located in the chambers 39A and bear against the free ends of the springs 37A. In the holes 31 are slidably fitted cylindrical slides 25 having enlarged heads 25A. The slides 25 have tapered inner ends which project toward the center of the annular body 1 and which have tapered end surfaces 25B and 25C. The roll pins 27 bear against one of the tapered end surfaces 25B and 25C. The roll pins 27 are located on the periphery of the ring plate 3. The heads 25A of the slides 25 are located in bores 35 of hollow covers 23 which are secured to the body 1 by means of set screws 33. In the bores 35 are arranged springs 29 which urge the slides 25 in a radial and inward direction, so that the slides 25 can move radially and outwardly against the springs 29 only when an external force above the force of the springs 29 is applied to the slides 25 in the outward direction.

The annular body 1 is secured, for example, to a rotatable part 19 of the associated machine, by means of bolts 21 so that the annular body 1 can rotate together with the rotatable part 19.

The scroll chuck device as constructed above operates as follows.

The annular body 1 is rotated in a counterclockwise direction in FIG. 3 by the rotatable part 19 of the associated machine which is, in turn, rotated by a drive motor (not shown) of the machine. The rotation of the annular body 1 is transmitted to the ring plate 3 by means of the roll pins 27. That is, since the ring plate 3 is integrally connected to the body 1, by means of the roll pins 27 which are in its clutch position designated by the solid line in FIG. 3, the ring plate 3 rotates together with the body 1 until the clamping jaws 7 come into contact with the outer periphery of the blank 100. On the other hand, since the support 13 is immovably connected to the immovable part 17 of the machine by means of the bolts 15, the rotation of the ring plate 3 causes the jaw holders 5 to radially move with the help of the scroll mechanism. That is, the rotational movement of the ring plate 3 is converted to the radial linear motion of the jaw holders 5 by means of the scroll mechanism. The jaw holders 5 move radially and inwardly until the clamping jaws 7 come into contact with the blank 100. After the clamping jaws 7 hold the blank 100 at three points, the jaw holders 5 can move no further, and accordingly, the ring plate 3 can rotate no further. That is, a braking force due to the jaw holders 5 is applied to the ring plate 3, resulting in stoppage of the rotation of the latter. At this stoppage, the blank 100 is firmly clamped by the clamping jaws 7.

Further rotation of the annular body 1 after the stoppage of the ring plate 3 causes the roll pins 27 to roll on the ring plate 3, since a large frictional force due to the ring plate 3 which is now stopped is applied to the roll pins 27. As a result of rolling the roll pins 27, they cause the slides 25 to move radially and outwardly against the springs 29, so that the roll pins 27 which are located in the chambers 39A are moved into the chambers 39B, as shown at 27' in FIG. 3. The roll pins 27' located in the chambers 39B are substantially idle in the chambers 39B without providing any resistance force, braking the rotation of the annular body 1 to the latter. That is, the roll pins 27' are in an idle position. The braking force which is otherwise applied to the body 1 by means of the presence of the roll pins 27 can be thus released after the clamping jaws 7 hold the blank 100, so that the output of rotational movement of the machine cannot be decreased.

It will be easily understood that when the clamping jaws are released i.e. when the blank is unclamped, an operation opposite to the operation mentioned above is effected.

As can be seen from the above discussion, the roll pins 27 and the slides 25 having wedge shaped inner ends cooperate to provide clutch devices which transmit the rotational movement. In the illustrated embodiment, two diametrically arranged clutch devices are provided. However, the number of the clutch devices is not limited to two and may be one or more than two. In case of the provision of a plurality of clutch devices, they are preferably arranged at a equiangular distance on the same imaginary circle.

Figure 2:
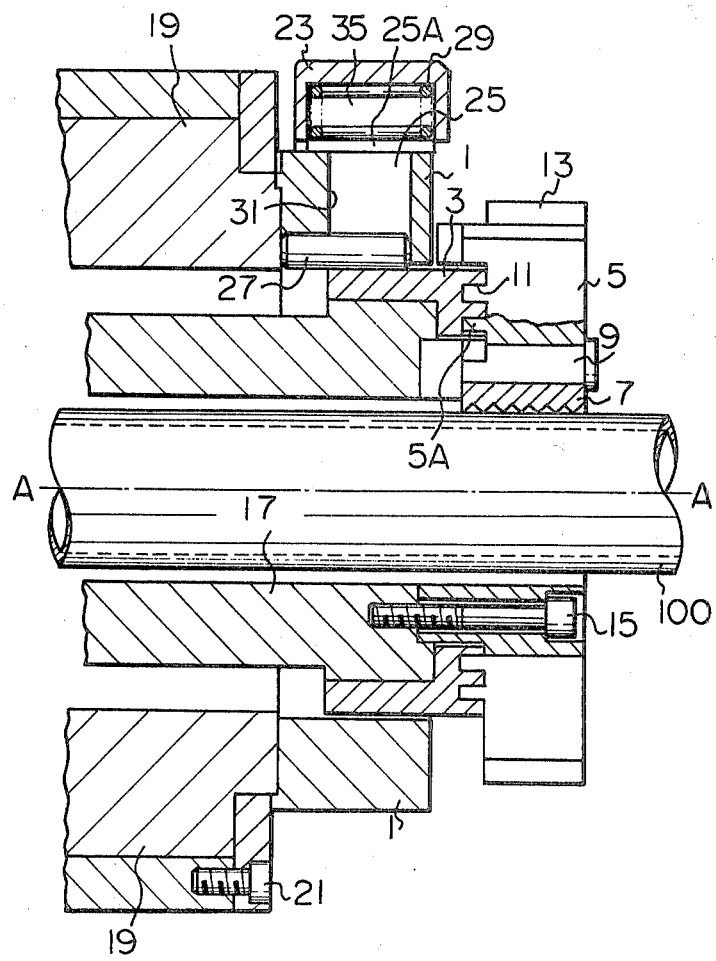
FIG. 2 is a sectional view taken along the line II—II in FIG. 3.

The embodiment shown in FIGS. 1–3 is directed to a scroll chuck device which is applied to a machine tool in which a blank, such as a pipe, is stationary and tools such as cutters, chasers, biting tools (not shown) of the machine are rotated around the stationary blank. However, the present invention can be also applied to a machine tool in which a blank is rotated and tools are stationary. In FIGS. 1–3, the tools (not shown) are located, for example, on the right hand side (FIG. 2) of the scroll chuck device and are connected to the rotatable part 19 by means of a proper rotation transmitting device (not shown) or are directly connected to a motor shaft (not shown) of the machine, so that the tools can rotate around the blank 100 to machine (cut, groove, or thread) the latter. On the contrary, when the present invention is applied to a machine tool in which the blank is rotated, the immovable part 17 is on the one hand replaced by a rotatable part connected to a rotating shaft (not shown) of the machine, and, on the other hand, the rotatable part 19 is replaced by an immovable part connected to an immovable portion (not shown) of the machine. In this application, the part 17 which is now a rotatable part is rotated in a clockwise direction, so that the holder support 13 and accordingly the jaw holders 5 are rotated also in a clockwise direction, unlike the embodiment illustrated in FIGS. 1–3. When the holder support 13 rotates in a clockwise direction, the ring plate 3 does not rotate since the braking force due to the roll pins 27 is applied to the ring plate 3, so that the jaw holders 5 radially and inwardly move until the clamping jaws 7 come into contact with the outer periphery of the blank 100. After the clamping jaws 7 hold the blank 100, the jaw holders 5 can move no further so that the ring plate 3 begins to rotate together with the holder support 13 in a clockwise direction. When the ring plate 3 rotates in a clockwise direction, the roll pins 27 causes the slides 25 to move outward against the springs 29 and are moved to positions 27'. Consequently, the roll pins at 27' give no resistance or brake to the ring plate 3.

Figure 4:
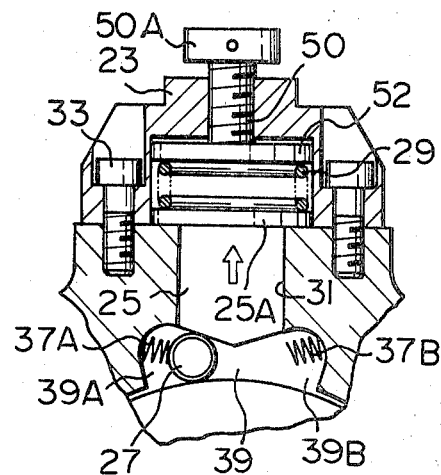
FIG. 4 is an enlarged sectional view of an essential part of a scroll chuck device according to another embodiment of the present invention.
Figure 5:
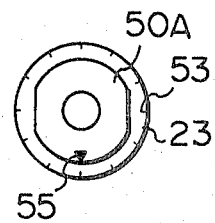
FIG. 5 is a plan view of a head of an adjusting screw shown in FIG. 4.

In an embodiment illustrated in FIGS. 4 and 5, the hollow cover 23 is provided with an adjusting screw 50 with a head 50A. Between the adjusting screw 50 and the spring 29 there is provided a plate 52 which bears against the spring 29. The adjusting screw 50 is adapted to control the initial spring force of the spring 29 in order to control the torque required for releasing the roll pin 27, i.e. for moving the roll pin into its idle position. Preferably, graduations 53 are provided on the top surface of the cover 23 to indicate the magnitude of the torque, and the head 50A of the adjusting screw 50 has thereon a reference mark 55, whereby the adjusting screw 50 can be easily set at a predetermined torque position.

Figure 6:
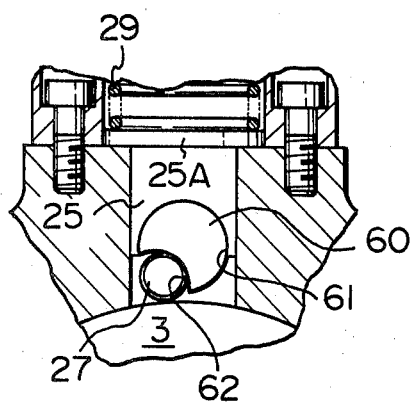
FIG. 6 shows a variant of FIG. 3.
Figure 7:
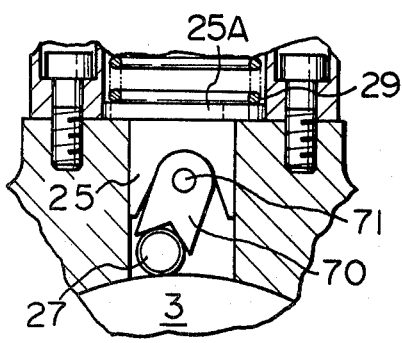
FIG. 7 shows another variant of FIG. 3.

FIGS. 6 and 7 shows two different embodiments in which an intermediate member such as a claw 60 (FIG. 6) or 70 (FIG. 7) is provided between the roll pin 27 and the slide 25 so that the slide 25 is moved outward by the roll pin not directly but through the claw 60 or 70. That is, in FIG. 6, the slide 25 is provided, on its inner end, with a round groove 61 which has an arc slightly larger than a semi arc of a circle and in which a correspondingly shaped claw 60 is fitted so as to be free to rotate in the groove 61. The claw 60 has an arc shaped recess 62. The claw 60 does not come out of the groove 61 since the arc of the groove 61 is slightly larger than a semi arc.

In FIG. 7, the claw 70 is rotatably connected to the slide 25 by means of a pivot pin 71. The claw 70 has a recessed inner end against which the roll pin 27 bear.

It will be easily understood that the embodiments shown in FIGS. 6 and 7 operate similarly to the embodiment shown in FIGS. 1-3.

It should be noted that the springs 29 can be replaced by another resilient member, such as solid rubber or a sponge.

Figure 8:
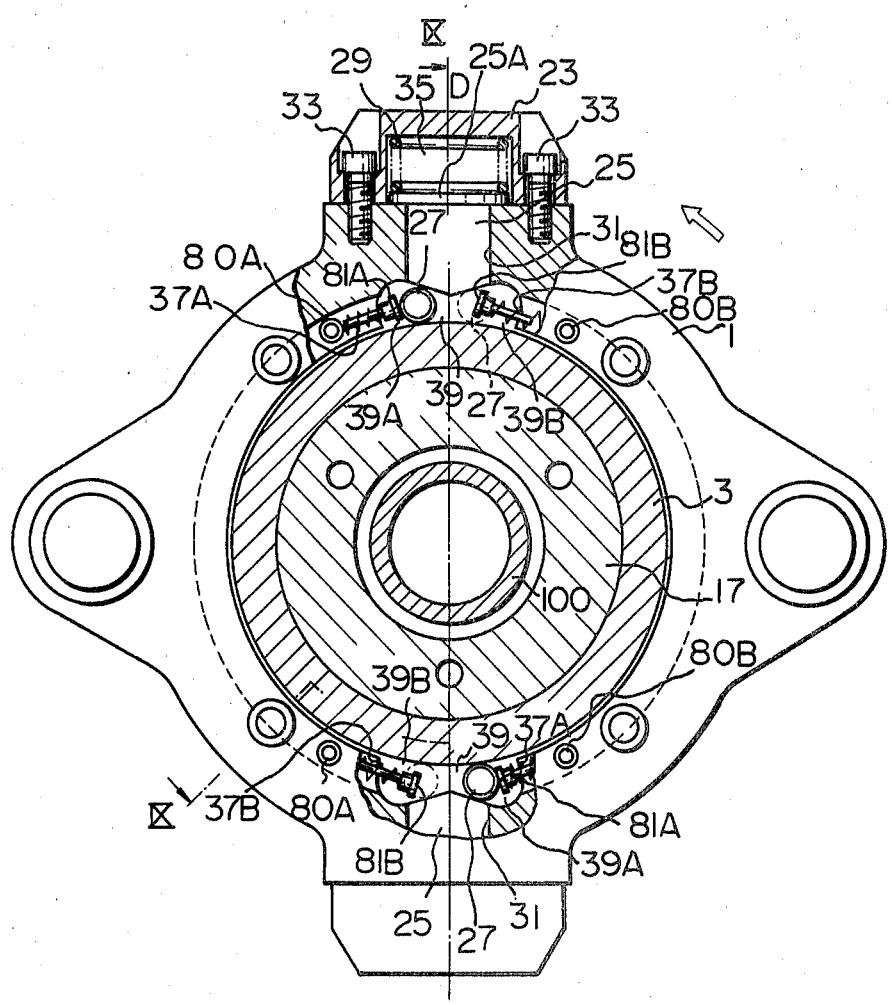
FIG. 8 is a view similar to FIG. 3, showing still another embodiment of the present invention.

FIGS. 8-12 shows still another embodiment of the present invention. In this embodiment, as shown in FIG. 8, the annular body 1 has pins 80A and 80B secured thereto. The pins 80A and 80B are secured to one end of the cushion springs 37A and 37B, respectively. The other ends of the springs 37A and 37B are connected to abutment pins 81A and 81B which extend in the springs 37A and 37B, respectively. The roll pins 27 bear against one of the abutment pins 81A and 81B. The provision of the abutment pins 81A and 81B prevents the springs 37A and 37B from being diverged from the imaginary longitudinal axes thereof when the springs 37A and 37B are compressed. That is, the abutment pins 81A and 81B ensure that the roll pins 27 come into contact with one of the abutment pins without making the springs 37A and 37B eccentric.

Figure 9:
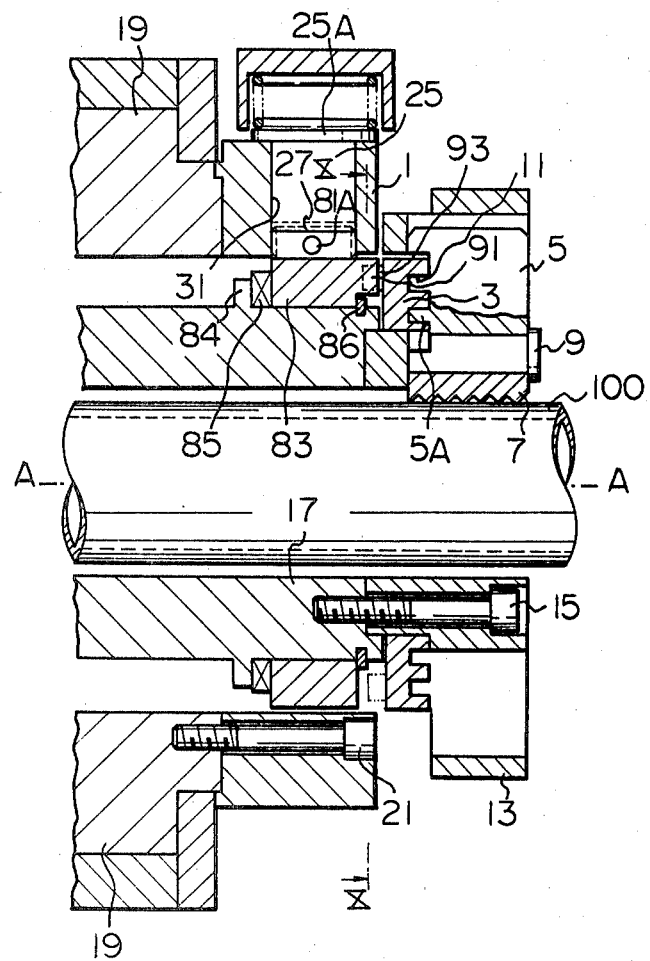
FIG. 9 is a sectional view taken along the line IX—IX in FIG. 8.
Figure 10:
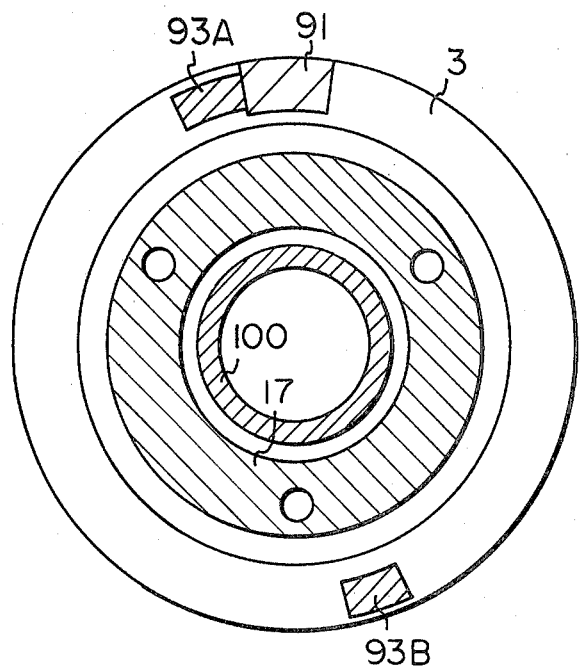
FIG. 10 is a sectional view taken along the line X—X in FIG. 9.
Figure 11:
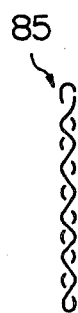
FIGS. 11 and 12 are side view and an elevational view of a corrugated plate washer used in an embodiment shown in FIGS. 8 and 9.
Figure 12:
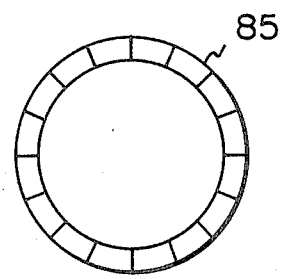

Furthermore, in the modified embodiment illustrated in FIGS. 8-12, a clutch ring 83 is additionally provided, which is rotatably attached to the periphery of the immovalbe part 17. The axial movement of the clutch ring 83 is limited by a peripheral projection 84 formed on the immovable part 17 and a ring stop 86 which is secured to the immovable part 17. The roll pins 27 are located on the clutch ring 83. Between the clutch ring 83 and the peripheral projection 84 there is provided a corrugated plate washer 85 which serves as a brake member of the clutch ring 83, as shown in FIGS. 11 and 12. The corrugated plate washer 85 is adapted to prevent the clutch ring 83 from being rotated in a clockwise direction in FIG. 8 under the influence of the roll pins 27 which run into the chambers 39B, in order to keep the clamping force of the clamping jaws 7. Such an undesirable rotation of the clutch ring 83 may be caused by the friction between the roll pins 27 and the clutch ring 83 when the roll pins 27 in the chambers 39A run into the chambers 39B.

The clutch ring 83 has a projection 91 on the periphery thereof, and the ring plate 3 has two projections 93A and 93B which are, for example, diametrically arranged on the periphery of the ring plate 3, as shown in FIGS. 9 and 10. Therefore, the clutch ring 83 can be angularly rotated relative to the ring plate 3 between a first position in which the projection 91 comes into contact with the projection 93A and a second position in which the projection 91 comes into contact with the projection 93B.

When the annular body 1 is rotated in a counterclockwise direction in FIG. 8 by the rotatable part 19 of the machine which is, in turn, rotated by the drive motor (not shown), the rotation of the annular body 1 is transmitted to the ring plate 3 by means of the roll pins 27, the projection 91 of the clutch ring 83 and the projection 93A of the ring plate 3, which projection 93A is engaged by the projection 91. The rotational movement of the ring plate 3 is converted to the radial linear movement of the jaw holders 5, and, accordingly, of the clamp jaws 7, similarly to the embodiment shown in FIGS. 1-3.

Further rotation of the annular body 1 after the ring plate 3 stops rotating causes the roll pins 27 to roll on the clutch ring 83, since the clutch ring 83 is integral with the ring plate 3 due to the engagement between the projections 91 and 93A. Consequently, the roll pins 27 cause the slides 25 to move radially and outwardly against the springs 29 and are moved into the chambers 39B. The roll pins 27 tend to rotate the clutch ring 83 in a clockwise direction when the roll pins 27 go out from the chambers 39A into the chambers 39B. This rotation of the clutch ring 83 in a clockwise direction causes the jaw holders 5 and accordingly the clamping jaws 7 to move back i.e. to move radially and outwardly, resulting in the release of the clamping force. However, according to the embodiment shown in FIGS. 8-12, the corrugated plate washer 85 prevents the clutch ring 83 from being rotated by the roll pins 27 in a clockwise direction in FIG. 8 since the corrugation provides a large friction between the washer 85 and the clutch ring 83 so that the rotation of the clutch ring 83 which would otherwise occur due to the roll pins 27 which move into the chambers 39B is braked by the corrugated plate washer 85.

As can be understood from the above discussion, according to the present invention, the scroll chuck device is free from any braking force or resistance which is applied to the output of the associated machine, after the blank is clamped by the clamping jaws.

Furthermore, according to the present invention, the corrugated plate washer between the clutch ring and the immovable part of the machine, prevents the clamping jaws from becoming loose, once the clamping jaws clamp the blank.

The invention has been described in detail with particular reference to preferred embodiments thereof, but it will be understood that variations and modifications can be effected without changing the basic scope of the invention as described herein above.

We claim:

1. A scroll chuck device comprising an annular body, a ring plate which is rotatably fitted in the annular body and which has scroll grooves, jaw holders on the ring plate which have clamping jaws and which are engaged in the corresponding scroll grooves of the ring plate so that the relative rotational movement between the ring plate and the jaw holders causes the latter to radially move, and at least one clutch means between the annular body and the ring plate for transmitting the rotational movement only in one direction, said clutch means including a slide which is slidably fitted in the annular body in radial directions, a chamber provided in the annular body, and a roll pin which is arranged in the chamber and which is located on the ring plate to bear against the slide, said roll pin being movable between a clutch position in which the roll pin causes the annular body and the ring plate to rotate together and an idle position in which the roll pin is inoperative, said slide having at its inner end a rotatable element against which the roll pin always bears.

2. A scroll chuck device comprising an annular body, a ring plate which is rotatably fitted in the annular body and which has scroll grooves, jaw holders on the ring plate which have clamping jaws and which are engaged in the corresponding scroll grooves of the ring plate so that the relative rotational movement between the ring plate and the jaw holders causes the latter to radially move, and at least one clutch means between the annular body and the ring plate for transmitting the rotational movement only in one direction, said clutch means including a slide which is slidably fitted in the annular body in radial directions, a chamber provided in the annular body, and a roll pin which is arranged in the chamber and which is located on the ring plate to bear against the slide, said roll pin being movable between a clutch position in which the roll pin causes the annular body and the ring plate to rotate together and an idle position in which the roll pin is inoperative, said chamber including two symmetrical chamber elements connected to each other, each having therein a cushion spring for absorbing the movement of the roll pin which moves from the clutch position in which the roll pin is located in one of the chamber elements, to the position in which the roll pin is located in the other chamber element and vice versa.

3. A scroll chuck device according to claim 2, wherein said slide comprises a wedge-shaped inner end having two tapered surfaces defining the two symmetrical chamber elements, respectively, said roll pin bearing against one of the tapered surfaces and moving between the clutch position and the idle position while radially moving the slide.

4. A scroll chuck device according to claim 2, further comprising abutment pins which are connected to and extend in the cushion springs so that the roll pin can bear against one of the abutment pins.

5. A scroll chuck device comprising an annular body, a ring plate which is rotatably fitted in the annular body and which has scroll grooves, jaw holders on the ring plate which have clamping jaws and which are engaged in the corresponding scroll grooves of the ring plate so that the relative rotational movement between the ring plate and the jaw holders causes the latter to radially move, and at least one clutch means between the annular body and the ring plate for transmitting the rotational movement only in one direction, said clutch means including a slide which is slidably fitted in the annular body in radial directions, a chamber provided in the annular body, and a roll pin which is arranged in the chamber and which is located on the ring plate to bear against the slide, said roll pin being movable between a clutch position in which the roll pin causes the annular body and the ring plate to rotate together and an idle position in which the roll pin is inoperative, said clutch means further including a clutch ring which is provided between the roll pin and the ring plate and which is normally connected to the ring plate so as to rotate together therewith, and a braking member which bears against the clutch ring to give a braking force to the clutch ring in a predetermined direction.

6. A scroll chuck device according to claim 5, wherein said clutch ring is connected to the ring plate so as to rotate together when the roll pin is in its clutch position or idle position, and the clutch ring is rotatable relative to the ring plate when the roll pin moves between the clutch and idle positions.

7. A scroll chuck device according to claim 5, wherein said braking member comprises a corrugated ring plate washer.

* * * * *